(No Model.) 2 Sheets—Sheet 1.

A. MILLER.
SEED DRILL.

No. 316,806. Patented Apr. 28, 1885.

Attest:
H. S. Reeside
W. J. Bernhard

Inventor:
Abraham Miller
per Edson Bro's.
Attorneys

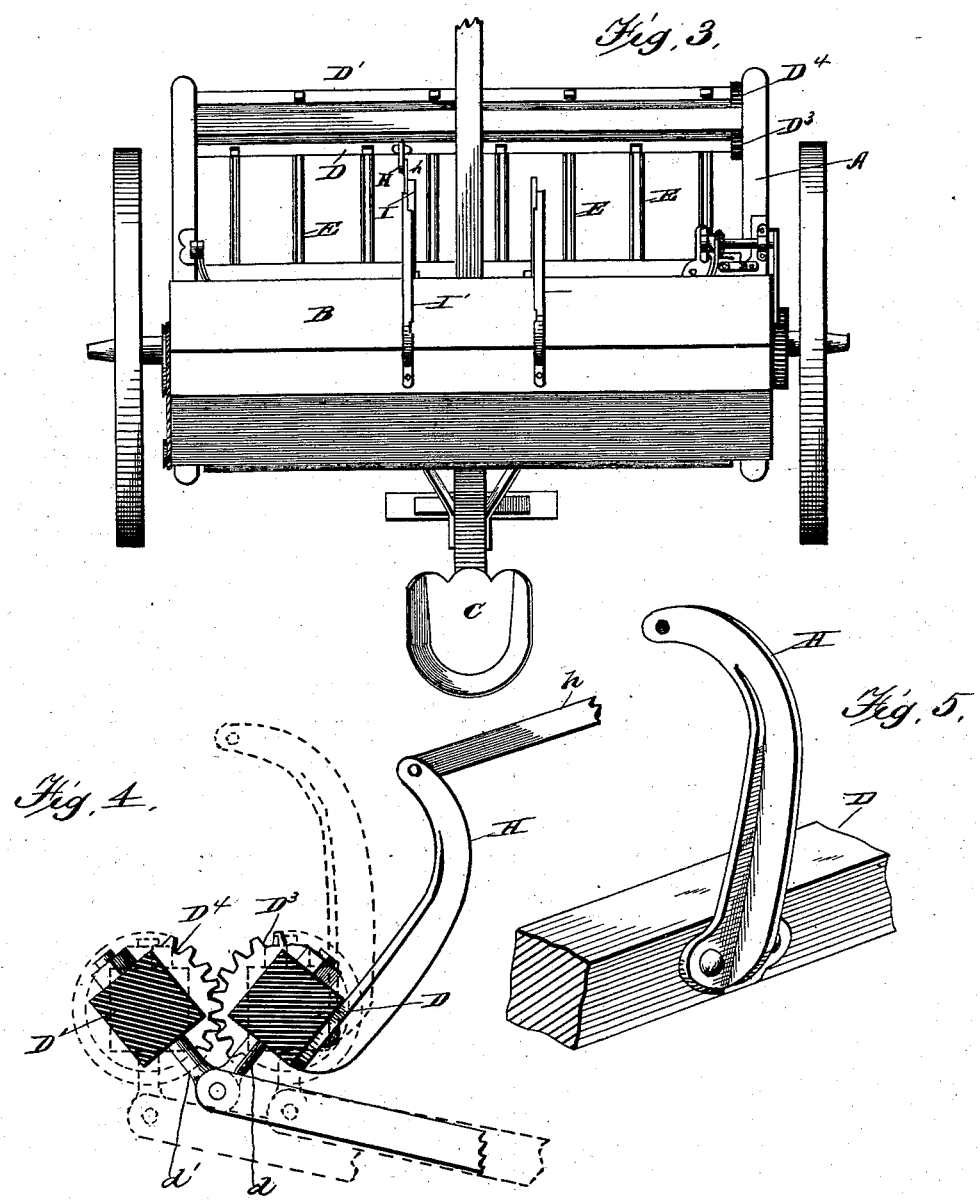

UNITED STATES PATENT OFFICE.

ABRAHAM MILLER, OF NEWARK, ASSIGNOR TO THE NEWARK MACHINE COMPANY, OF COLUMBUS, OHIO.

SEED-DRILL.

SPECIFICATION forming part of Letters Patent No. 316,806, dated April 28, 1885.

Application filed August 23, 1884. (No model.)

*To all whom it may concern:*

Be it known that I, ABRAHAM MILLER, a citizen of the United States, residing at Newark, in the county of Licking and State of Ohio, have invented certain new and useful Improvements in Seed-Drills, of which the following is a specification, reference being had therein to the accompanying drawings, and in which—

Figure 1:
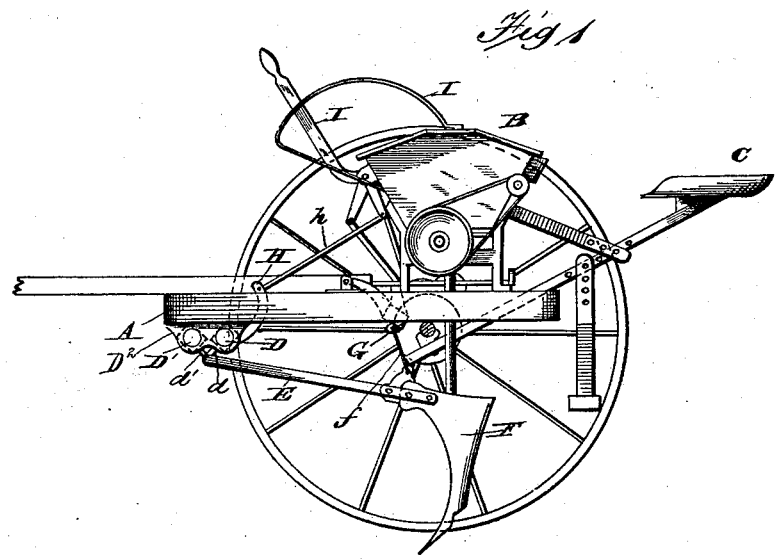
Figure 2:
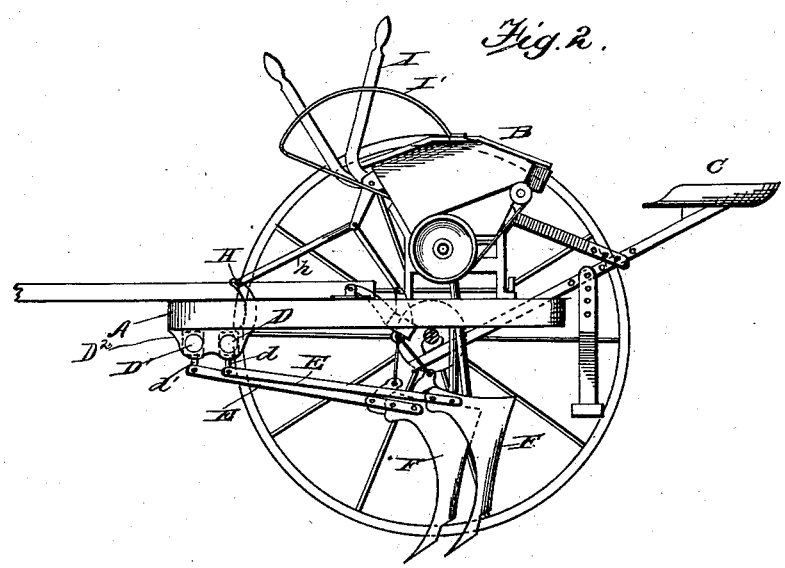

Figure 1 is a side elevation of a grain and fertilizer drill embodying my improvements, with one of the bearing-wheels removed to show details of construction. Fig. 2 is a similar side elevation showing the boots out of alignment. Fig. 3 is a top plan view, and Figs. 4 and 5 are detail views of the mechanism for adjusting the boots into and out of alignment.

The same letters of reference in the several drawings denote like or corresponding parts.

In the drawings I have exhibited, for clearness' sake, a complete machine embodying features which are described and claimed in other applications; but my description in this case will be confined to the invention claimed hereinafter, which is an improved device for changing the arrangement of the boots in a seed and fertilizer drill from a straight to a zigzag line, and vice versa, as hereinafter fully set forth.

A is the frame; B, the hopper; C, the driver's seat.

D D' are two rock-shafts, journaled one behind the other transversely of the machine in suitable bearings, $D^2$, on the under side of the carrying-frame A, at the forward end thereof. On the under side of these rock-shafts are depending arms $d$ $d'$, those on one shaft alternating with those on the other, and pivotally connected, in the same order, with the forward ends of the drag-bars E, to the rear or lower ends of which are attached adjustably, as shown, or otherwise, the boots F. The lower ends of the bars are sustained by links $f$, connected to a hoisting-bar, G, which is raised and lowered by suitable mechanism, unnecessary to be described. The two rock-shafts D D' are geared together, preferably at the left-hand end. The rear rock-shaft is provided with an arm, H, preferably a casting, rigidly secured to it and curving upward, and formed at its upper end with an eye, which receives one end of a link, $h$, connecting the arm with the lower end of a bent lever, I, fulcrumed upon the front face of the hopper within easy reach of the driver seated behind, and engaging the notched edge of a metal bow or strap, I', secured upon the front or top of the hopper, whereby the lever is securely held at the various points of adjustment desired.

By curving the link H, as shown, I am enabled to apply it to the side of the rock-shaft in a convenient and durable manner without interfering with the second rock-shaft; also to make the fulcrum higher up on the hopper, and the lower end of the lever I shorter. By curving the lever I, I am enabled to pivot it directly to the face of the hopper, which places the operator in a much better position for raising and lowering the boot and allows sufficient play for said lever.

It will be seen that by throwing the lever forward the ends of the depending arms, and consequently the drag-bars and the boots attached thereto, may be brought into alignment, as indicated in Fig. 1, while by pulling the lever backward the depending arms will be brought into the perpendicular position indicated in Fig. 2, and the boots will be made to assume a zigzag position or any intermediate degree of departure from a straight line that may be desired. A single rock-shaft only connected to alternate boots may be employed.

I am aware that rock-shafts geared together and adapted to throw the boots into the same line or into a zigzag position have been employed; and I do not therefore, broadly, claim such construction.

What I claim, and desire to secure by Letters Patent of the United States, is—

1. The combination, in a seeding-machine, of the carrying-frame, a rock-shaft having an upwardly-curved arm rigidly secured thereto, the alternate boots connected with said rock-shaft, a curved operating-lever hinged to the front of the hopper, and means, substantially as described, for securing said lever, substantially as set forth.

2. The boots, the drag-bars, a rock-shaft connected to every other drag-bar, and a link, in combination with a curved or bent lever fulcrumed upon the hopper, and means, substantially as described, for holding said lever also secured to the hopper, substantially as and for the purpose set forth.

3. The combination of the carrying-frame, the two shafts geared together, one of them having an upwardly-bent arm, the depending arms, drag-bars and boots connected alternately with said arms, and a bent or curved lever fulcrumed to the hopper, and a bow or strap, also secured to the hopper, as and for the purpose described.

4. The combination of the frame, the hopper, the bent or curved lever fulcrumed on the front of the hopper, the notched bow, the rock-shaft having the curved arm connected with the lever, the depending arms, and the boots, each alternate one of which is connected with the depending arms of the rock-shaft, substantially as and for the purpose described.

In testimony whereof I affix my signature in presence of two witnesses.

ABRAHAM MILLER.

Witnesses:
CHAS. C. GRASSER,
GEO. D. GRASSER.